United States Patent
Gilson et al.

(10) Patent No.: US 11,659,541 B2
(45) Date of Patent: *May 23, 2023

(54) COORDINATING WIRELESS DATA COMMUNICATIONS

(71) Applicant: Comcast Cable Communications, LLC, Philadelphia, PA (US)

(72) Inventors: Ross Gilson, Philadelphia, PA (US); David Urban, Downingtown, PA (US); James Davey, Dawsonville, GA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/350,956

(22) Filed: Jun. 17, 2021

(65) Prior Publication Data

US 2021/0314968 A1    Oct. 7, 2021

Related U.S. Application Data

(63) Continuation of application No. 16/708,162, filed on Dec. 9, 2019, now Pat. No. 11,064,507, which is a continuation of application No. 15/878,015, filed on Jan. 23, 2018, now Pat. No. 10,548,152.

(51) Int. Cl.
*H04W 72/12* (2023.01)
*H04W 72/04* (2023.01)
*H04W 72/08* (2009.01)
*H04W 84/12* (2009.01)
*H04W 72/0446* (2023.01)

(52) U.S. Cl.
CPC ....... *H04W 72/12* (2013.01); *H04W 72/0446* (2013.01); *H04W 72/082* (2013.01); *H04W 72/1226* (2013.01); *H04W 84/12* (2013.01)

(58) Field of Classification Search
CPC . H04W 72/00; H04W 72/12; H04W 72/0446; H04W 72/082; H04W 84/12
See application file for complete search history.

(56) References Cited

U.S. PATENT DOCUMENTS

| | | | |
|---|---|---|---|
| 9,144,084 B2 * | 9/2015 | Sadek | H04W 72/1215 |
| 10,548,152 B2 | 1/2020 | Gilson et al. | |
| 11,064,507 B2 * | 7/2021 | Gilson | H04W 72/12 |
| 2004/0162093 A1 | 8/2004 | Bevan et al. | |
| 2007/0105574 A1 | 5/2007 | Gupta et al. | |
| 2008/0225122 A1 | 9/2008 | Sarao et al. | |
| 2009/0130980 A1 | 5/2009 | Palanki et al. | |
| 2009/0203372 A1 | 8/2009 | Horn et al. | |
| 2010/0061317 A1 | 3/2010 | Gorokhov et al. | |
| 2012/0003932 A1 | 1/2012 | Zhodzishsky | |
| 2013/0121186 A1 | 5/2013 | Vajapeyam et al. | |
| 2017/0064741 A1 | 3/2017 | Zhou et al. | |
| 2018/0026738 A1 | 1/2018 | Pasulka et al. | |

OTHER PUBLICATIONS

US Patent Application filed Dec. 9, 2019, entitled "Coordinating Wireless Data Communications", U.S. Appl. No. 16/708,162.

* cited by examiner

*Primary Examiner* — Mohamed A Kamara
(74) *Attorney, Agent, or Firm* — BakerHostetler

(57) ABSTRACT

Systems, methods, and apparatuses are described for coordinating wireless communication. Various devices may be configured for wireless communication. The wireless communications may be coordinated via a backhaul communication channel and may minimize interference between the communications.

38 Claims, 10 Drawing Sheets

COORDINATING WIRELESS DATA COMMUNICATIONS

CROSS REFERENCE TO RELATED APPLICATIONS

This application is a continuation of U.S. patent application Ser. No. 16/708,162, filed Dec. 9, 2019, which is a continuation of U.S. patent application Ser. No. 15/878,015, filed Jan. 23, 2018, now U.S. Pat. No. 10,548,152, each of which are hereby incorporated by reference in their entirety.

BACKGROUND

In a wireless communication network, such as a Wi-Fi local area network, several wireless access points may serve a number of client devices within a premises or area. However, due to communication range limitations and/or frequency variations, the wireless access points may be unable to communicate with one another. Accordingly, the wireless access points may be unable to coordinate various wireless communications with the client devices, resulting in delayed communications, radio interference, and other inefficiencies.

These and other shortcomings are addressed in the present disclosure.

SUMMARY

Systems, methods, and apparatuses are described for coordinating wireless communication. Various devices may communicate wirelessly and may interfere with one another. For example, due to the relative positioning and/or other factors, a first station and a second station may cause interference with one another when wirelessly communicating with a first network device and a second network device, respectively. If wireless communications between the first network device and first station are expected to cause interference with the wireless communications between the second network device and second station, the wireless communications between the first network device and first station may be coordinated, via a backhaul communication channel, with the wireless communications between the second network device and the second station.

BRIEF DESCRIPTION OF DRAWINGS

The accompanying drawings, which are incorporated in and constitute a part of this specification, show embodiments and together with the description, serve to explain the principles of the methods and systems.

DETAILED DESCRIPTION

Figure 1A:
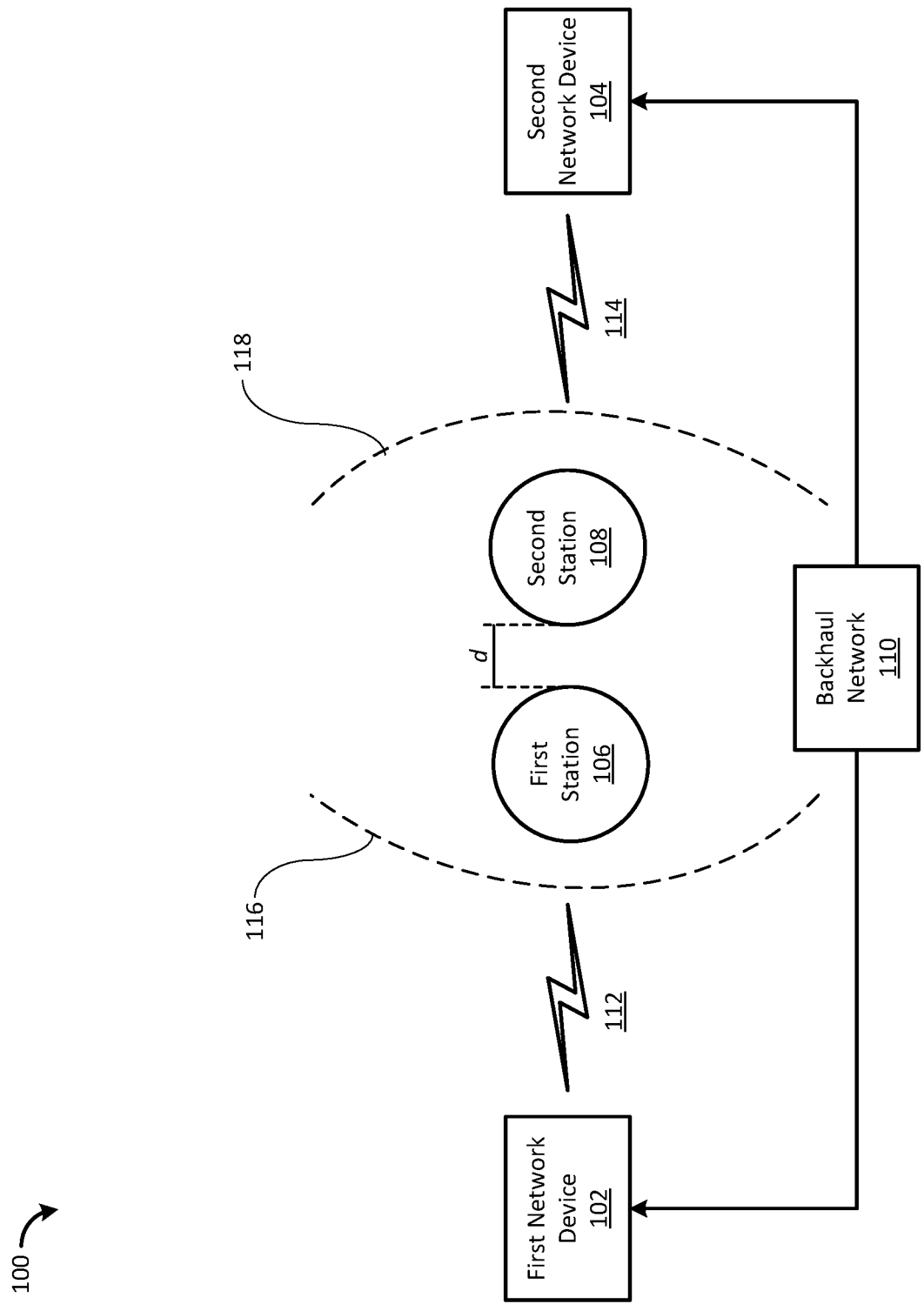
FIG. 1A shows a schematic diagram of an example system.

Systems and methods are described for coordinating wireless data communications. In a wireless communication network, one or more stations (e.g., client devices) may be disposed in relation to one more network devices (e.g., wireless routers with wireless access points). The stations may be within wireless communication range of the network devices. Yet, the network devices may not be within wireless communication range with one another. In example systems and methods, the communication of the network devices with respective stations may be coordinated by leveraging a backhaul network providing communication between the network devices. The backhaul network may comprise a wired network, such as an Ethernet or MoCA (Multimedia over Coax Alliance) network.

For example, a first station may perform reciprocal wireless communications with a first network device. A second station may perform reciprocal wireless communications with a second network device. The first and second network devices may be outside of wireless communication range of one another. Radio interference may potentially occur between the first and second stations, such as radio interference caused by one station performing a wireless transmission while the other station is attempting to receive a different wireless transmission.

To avoid this interference, after the second network device receives a message from the second station indicating that the second station wishes to transmit data to the second network device, the second network device may transmit a message indicating that the second network device has not scheduled any other transmissions involving the second network device and during the allocated time period. The message received by the second network device from the second station may be an RTS (request to send message). The message transmitted by the second network device may be a CTS (clear to send) message.

The second network device may also transmit the latter message to the first network device over the backhaul network (recalling that the first and second network devices are not within wireless communication range of one another). Along with other attributes of the system, the first network device may use this message from the second network device to avoid or reduce the likelihood that the second station's transmission will cause interference with the first station's reception of a transmission from the first network device. The first network device may implement a logic to avoid or minimize interference occurrences while also maximizing network throughput to the stations.

For example, the message from the second network device may indicate a time period during which the second station expects to perform the wireless transmission to the second station. Since this wireless transmission from the second station may potentially interfere with the first station's reception of the wireless transmission from the first network device, the first network device may delay sending the transmission to the first station. However, circumstances may reflect that the interference is unlikely to occur due to, for example, distance between the stations, the relative power levels of the stations, and/or an adjacent channel rejection value of one or more of the stations. If the chance of interference is sufficiently low, the first network device may forgo any delay and immediately perform the transmission to the first station. In this manner, no unnecessary delay is incurring, thereby increasing system performance. Yet if the chance of interference is sufficiently high, the first network device may continue with the delay with respect to the first station.

FIG. 1A shows an example system 100. The system 100 may comprise a first network device 102 and a second network device 104. A first station 106 may communicate with a first network device 102 via a first wireless communication channel 112. A second station 108 may communicate with a second network device 104 via a wireless second communication channel 114. The range at which the first network device 102 may effectuate wireless communication may be defined as a range 118. The range at which the second network device 104 may effectuate wireless communication may be defined as a range 116. The first station 106 and the second station 108 may be within the first range 116 and the second range 118. A backhaul network 110 may connect the first network device 102 and the second network device 104 to facilitate wireless communication in the system 100.

The system 100 may comprise, at least in part, a wireless local area network (WLAN). For example, the first network device 102 and the second network device 104 and the first station 106 and the second station 108 may comprise the wireless local area network. The wireless local area network may conform to the IEEE 802.11 standard, for example. The wireless local area network may be communicatively connected to a wide area network (WAN) (not shown), such as the Internet or a larger scale network with respect to the wireless area network. For example, the wireless local area network represented, at least in part, in FIG. 1A may comprise a sub-component of the wide area network. As such, one or more of the first network device 102 and the second network device 104 may communicatively connect to or provide a communication bridge to the wide area network. For example, the wireless local area network comprising the first network device 102 and the second network device 104, the first station 106 and the second station 108, etc. may comprise a wireless local area network found at a premises, such as a home or office location.

Each of the first network device 102 and the second network device 104 may comprise a computing device configured to facilitate wireless communication with the stations or other components of the system 100, such as the first station 106 and the second station 108. For example, the first and second network devices may comprise a router, a cable or DSL modem, a network switch, a network bridge, or any combination thereof. The first network device 102 and the second network device 104 may each function as wireless access points. For example, the first network device 102 may comprise a wireless router and the second network device 104 may comprise a wireless range extender. Each of the router and the range extender may incorporate a wireless access point.

Each of the first station 106 and the second station 108 may comprise a computing device configured to wirelessly communicate with the first network device 102 and/or the second network device 104. The first station 106 and the second station 108 may be considered "client" devices with respect to the wireless access points of the first network device 102 and the second network device 104. Each of the first station 106 and the second station 108 may comprise a wireless network interface controller (WNIC). As some examples, the first station 106 and/or the second station 108 may each comprise a personal computer, a laptop, a tablet computer, or a mobile device (e.g., a smart phone), each of which may be configured with wireless capabilities.

The first station 106 and the second station 108 may be spaced apart from one another by a distance d. The distance d may be used in coordinating the various transmissions between the first network device 102 and the second network device 104 and the first station 106 and the second station 108. The first station 106 and the second station 108 may each operate at a particular power level and/or with a particular receive sensitivity. The power levels and/or receive sensitivities of the first station 106 and the second station 108 may additionally or alternatively be used to coordinate communications in the system 100.

The first communication channel 112 may provide wireless communication between the first station 106 and the first network device 102. This communication over the first communication channel 112 may occur over a first channel. That is, the first network device 102 and the first station 106 may each be configured to communicate on the first channel. The second communication channel 114 may provide wireless communication between the second network device 104 and the second station 108. The communication over the second communication channel 114 may occur over a second channel, different from the aforementioned first channel. The second network device 104 and the second station may each be configured to communicate on the second channel.

The first communication channel 112 enabled by the first network device 102 may be limited to the range 118, as indicated by the curved dotted line in FIG. 1A. The second communication channel 114 enabled by the second network device 104 may be limited to the range 116, as indicated by the opposite curved dotted line in FIG. 1A. For example, the first network device 102 may provide coverage to one side of a residence (e.g., the range 118) and the second network device 104 may provide coverage to a second side of the residence (e.g., the range 116), with some overlapping area of coverage. The first station 106 and the second station 108 may be disposed within the overlapping area of coverage.

Figure 1B:
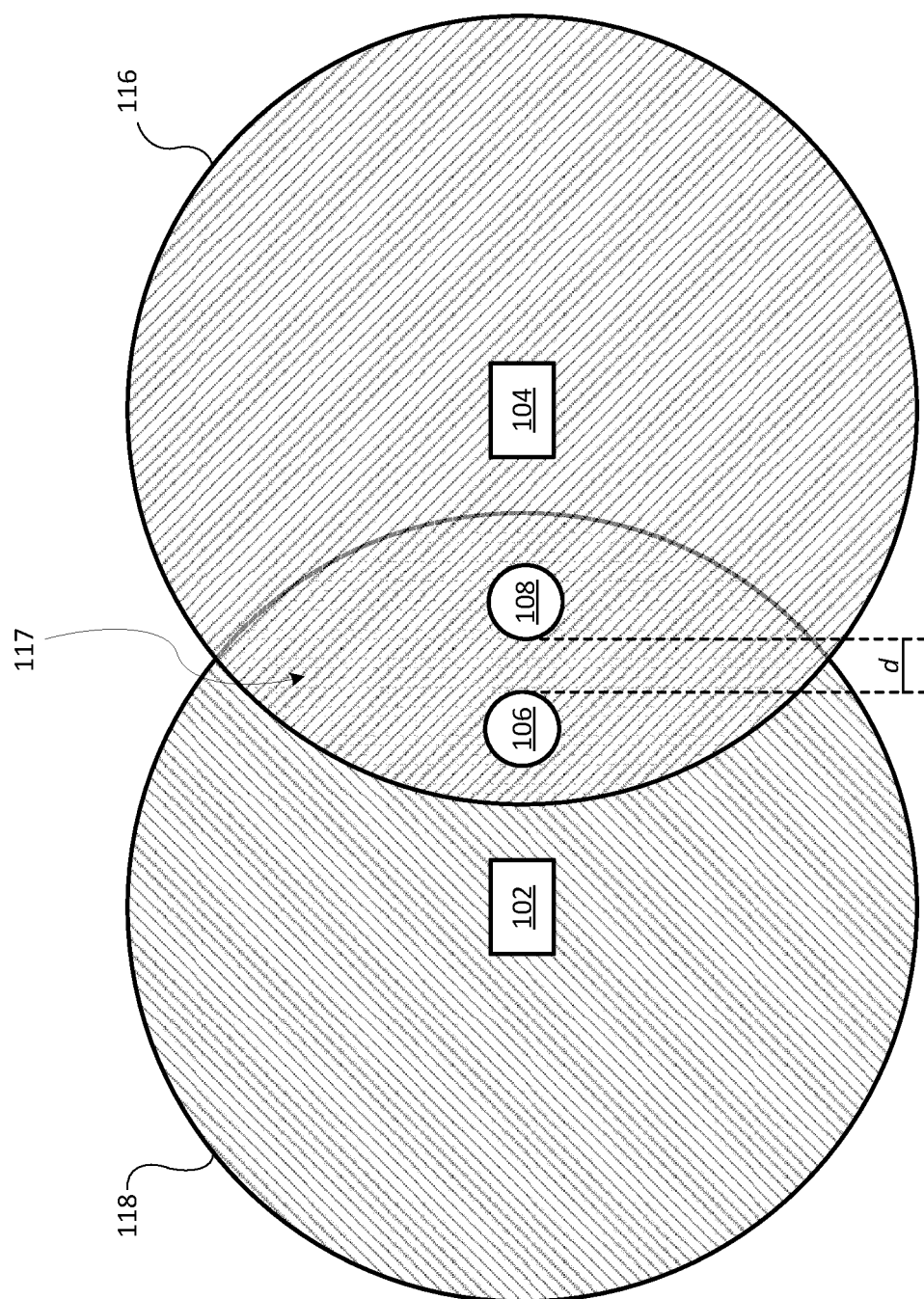
FIG. 1B shows a schematic diagram of an example system.

FIG. 1B shows an example representation of the respective ranges of the first network device 102 and the second network device 104. Again, the coverage of the first network device 102 extends to the range 118. The coverage of the second network device 104 extends to the range 116. The coverage areas of the first network device 102 and the second network device 104 overlap in the area 117. In this example arrangement shown in FIG. 1B, both the first station 106 and the second station 108 (spaced apart by distance d) are in range of both the first network device 102 and the second network device 104 (i.e., the common area 117). However, the first network device 102 and the second network device 104 are not within wireless range of one another. Thus, transmission interference may potentially occur if the first network device 102 transmits to the first station 106 while the second station 108 transmits to the second network device 104.

Figure 1C:
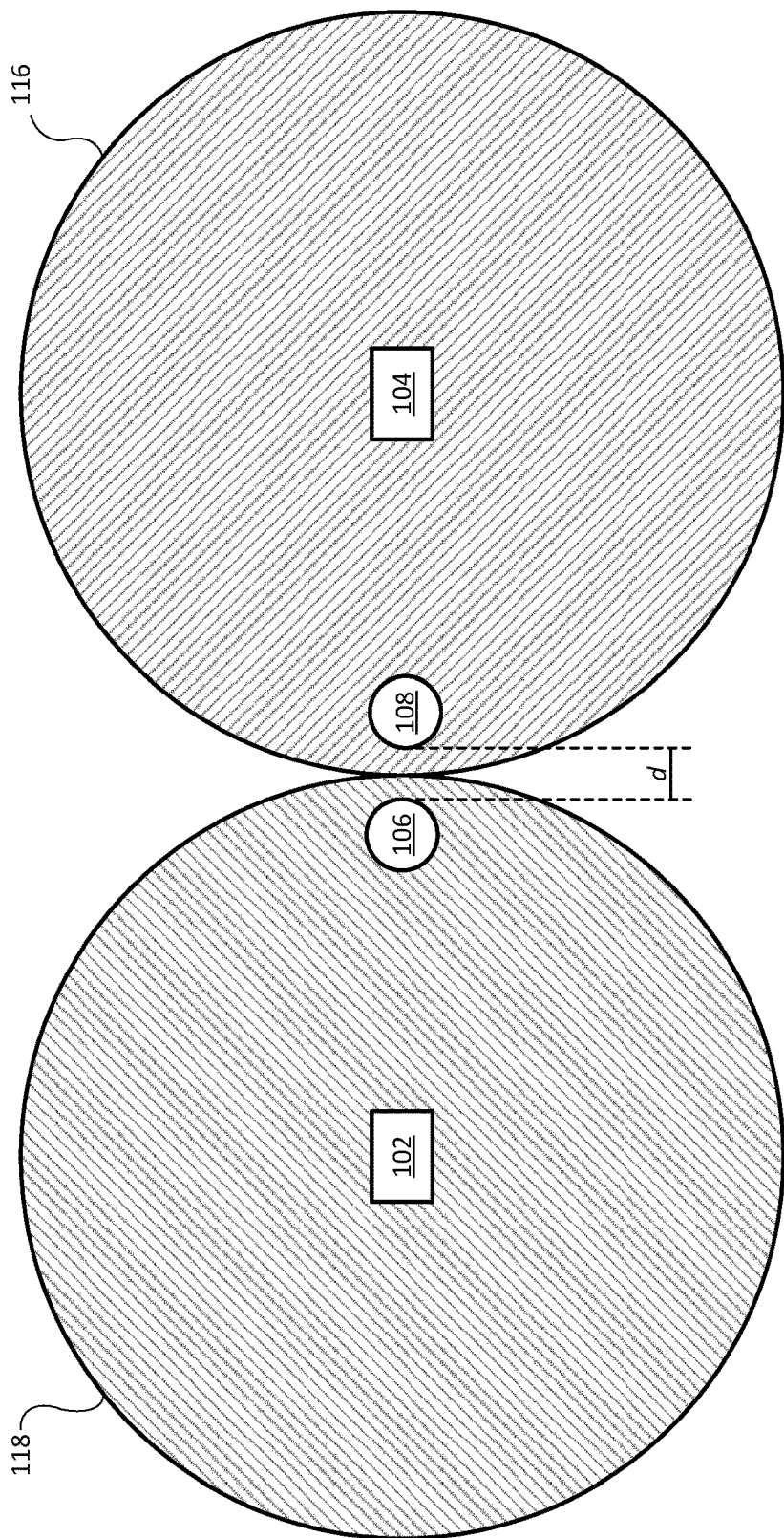
FIG. 1C shows a schematic diagram of an example system.

FIG. 1C shows an example arrangement in which interference between stations may potentially occur. In this arrangement, the first station 106 and the second station 108 are still spaced apart by the distance d, as was also the case in FIGS. 1A and 1B. The first network device 102 has a wireless coverage extending to the range 118 and the second network device 104 has a wireless coverage extending to the range 116. Like shown in FIGS. 1A and 1B, the first network device 102 and the second network device 104 are not within wireless communication range of one another. However, the range 118 of the first network device 102 and the range of the second network device 104 do not overlap. Nor is the first station 106 within the range 116 of the second network device 104. Similarly, the second station 108 is not with the range 118 of the first network device 102. Nonetheless, a transmission by the second station 108, such as to the second network device 104, may still cause interference with a reception at the first station 106, such as a reception of a transmission from the first network device 102. The interference may still occur according to various factors, including the distance d, the power levels of each of the first station 106 and second station 108, and/or other factors discussed herein.

In an example arrangement (not shown), the first network device 102 and the second network device 104 may be outside of communication range of one another. The first station 106 may be within communication range of both the first network device 102 and the second network device 104. However, the second station 108 may be within range of the second network device 104 but out of range of the first network device 102. In this example arrangement, interference may still potentially occur between the first station 106 and the second station 108, contingent upon the various factors described herein.

Referring back to FIG. 1A, the first network device 102 and the second network device 104 may each be configured to implement logic to prevent or minimize this transmission interference by coordinating transmissions involving the first network device 102 and the second network device 104 and the first station 106 and the second station 108. For example, the first network device 102 may wait to transmit to the first station 106 until the transmission by the second station 108 to the second network device 104 is complete. The logic implemented by the first network device 102 and the second network device 104 may determine whether such a delay is warranted based on one or more factors. The logic to coordinate communications within the system 100 will be described in further detail below.

The backhaul network 110 may comprise a network configured to provide a communication channel between the first network device 102 and the second network device 104. The backhaul network 110 may comprise a wired network, such as an Ethernet network or a network implemented over coaxial cable (e.g., a network according to the MoCA (Multimedia over Coax Alliance) standards). For example, the backhaul network 110 may comprise a wireless network. This wireless network may be implemented using a different protocol than that used to implement the wireless communications between the network devices and stations. For example, the backhaul network 110 may be considered a part of a local area network of which the wireless local area network having the first network device 102 and the second network device 104 and the first station 106 and the second station 108 is another part. For example, the backhaul network 110 may be discrete from the wireless local area network having the first network device 102 and the second network device 104 and the first station 106 and the second station 108.

The backhaul network 110 may facilitate coordination of transmissions between the first network device 102 and the first station 106 and between the second network device 104 and the second station 108. For example, the second network device 104 may transmit an indication over the backhaul network 110 to the first network device 102 that the second station 108 may imminently perform a transmission to the second network device 104. Thus, the first network device 102 may delay any pending transmission to the first station 106 until the second station 108 has completed the transmission to the second network device 104.

The first station 106 may communicate with the first network device 102 by first transmitting a request to send (RTS) message to the first network device 102 indicating that the first station 106 wishes to transmit one or more data packets to the first network device. The RTS message may comprise a transmitter address (e.g., a media access control (MAC) address) of the first station 106 and a receiver address (e.g., a MAC address) of the first network device 102. For example, the transmitter and/or receiver address may include an identifier, such as an IP address, that may be cross-referenced in a table of MAC addresses to determine the relevant MAC address of the transmitter and/or receiver.

The first network device 102 may receive the RTS message. When the first network device 102 determines that the first communication channel 112 is clear (e.g., no other stations or other devices have requested to send), the first network device 102 may transmit a clear to send (CTS) message to the first station 106. The CTS message may indicate that the first station 106 may transmit the first station's 106 data packet(s) to the first network device 102. The CTS message may comprise a receiver address of the first station 106. The CTS message may comprise an expected duration for completing the remainder of the data transaction between the first station 106 and the first network device 102, which may include the transmission of the RTS message, the data packet(s), and an acknowledgement. The CTS message may further serve to indicate to other stations within communication range of the first network device 102 that those other stations should not attempt to transmit to the first network device 102 during a specified time period (e.g., the above-mentioned expected duration of the first station's 106 transmission).

The first station 106 may transmit the first station's 106 data packets to the first network device 102 (e.g., based on or in response to receiving the CTS message from the first network device 102). The first network device 102 may transmit an acknowledgement (ACK) to the first station 106 (e.g., based on or in response to determining the successful transmission of the data packet(s)). The ACK may indicate to the first station 106 that the data transaction has successfully completed. The ACK further may indicate to other stations that those other stations may now initiate data transactions (or portions thereof) with the first network device 102. For example, the ACK may comprise an indication that the transmission from the first station 106 has completed in a shorter duration than expected (e.g., the duration element of the RTS and/or CTS messages). The shortened duration may be the result, for example, of an unexpected increase in the packet fire rate of the first station 106. This example may add a dynamic duration aspect to the data transaction.

Data transactions (e.g., the above example of a data transaction) between the first network device 102 and the first station 106 may be similarly implemented between the second network device 104 and the second station 108, as well as between additional network devices and stations (not shown) within the system 100.

Figure 2:
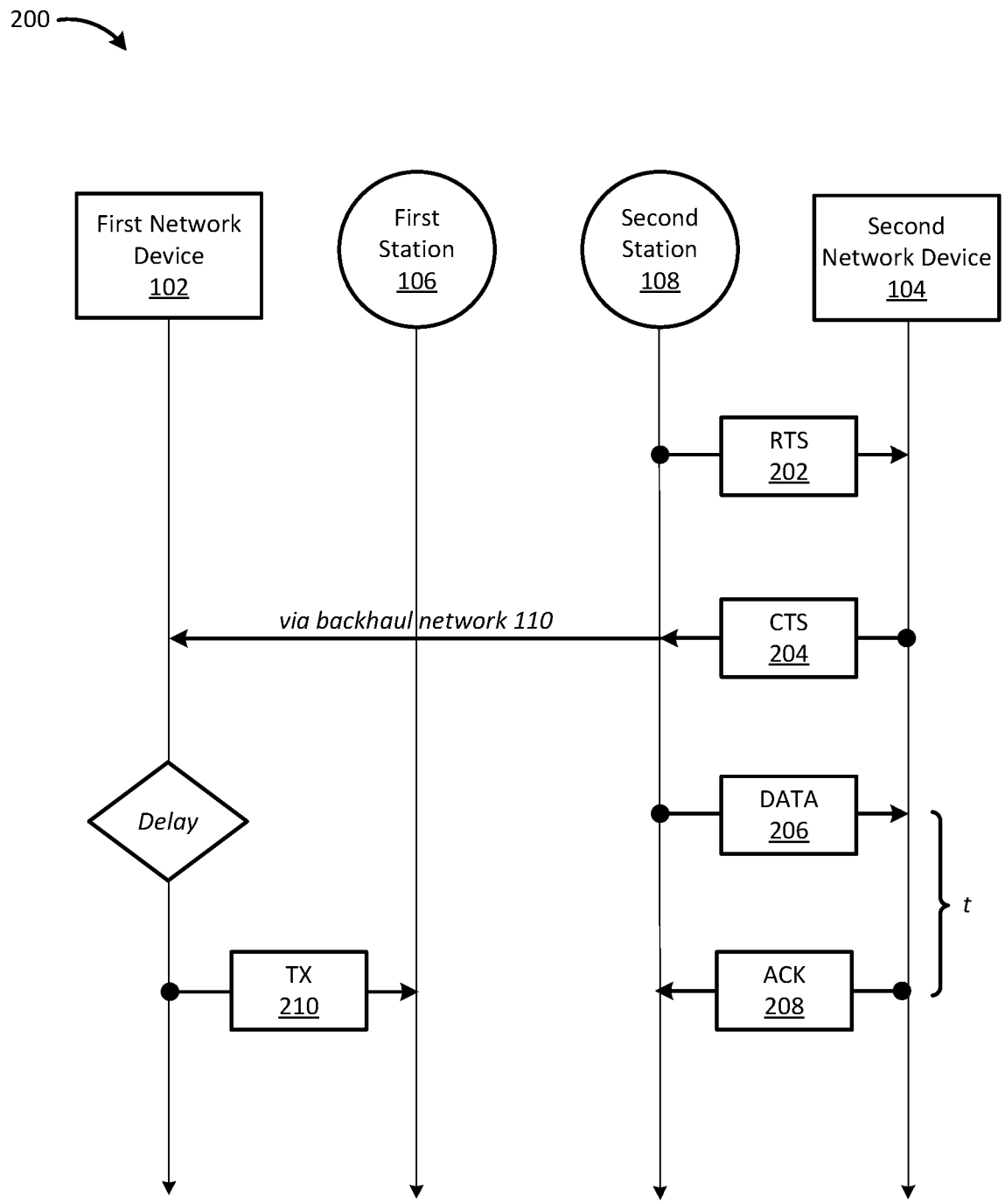
FIG. 2 shows a flow diagram of an example operation.

FIG. 2 shows an example flow diagram of operations relating to coordination of wireless data communications. Initially, an RTS 202 is transmitted from the second station 108 to the second network device 104. The RTS 202 may comprise an indication that the second station 108 has data to transmit to the second network device 104. The RTS 202 may comprise an address of the second station 108, an address of the second network device 104, and/or an expected duration for the data transaction to complete, including expected durations of the transmissions of the RTS 202 and subsequent CTS, data packets, and ACK.

The second network device 104 may determine that the second station 108 may transmit its data packets (e.g., based on or in response to receiving the RTS 202) and, accordingly, transmit a CTS 204 to the second station 108 and other stations within wireless range of the second network device 104. The CTS 204 may comprise an address of the second station 108 and a duration element. The duration element of the CTS 204 may indicate the expected periods of time over which data packets are transmitted from the second station 108 to the second network device 104 and the ACK is transmitted back to the second network device 104. The time period during which the second station 108 transmits its data packets to the second network device 104 is represented by time period t in FIG. 2. It is noted that the timing of the various transmissions, etc. shown in FIG. 2 are not to scale. For example, it is contemplated that the time period between the second network device 104 receiving the RTS 202 and the second network device 104 transmitting the CTS 204 may be significantly shorter than the time period t during which the data 206 is transmitted from the second station 108 to the second network device 104.

The second station 108 may receive the CTS 204 from the second network device 104 and accordingly transmit the data 206 to the second network device 104. The transmission of the data 206 to the second network device 104 may be performed as a single transmission or a series of transmissions. The transmission of the data 206 to the second network device 104 may occur over the time period t. When the transmission of the data 206 to the second network device 104 is complete, an ACK 208 may be sent back to the second station 108.

The second network device 104 may also transmit the CTS 204 to the first network device 102, such as at the same time as the second network device 104 also transmits the CTS 204 to the second station 108. Since the first network device 102 is outside of the wireless range 116 (FIGS. 1A, 1B) of the second network device 104, the CTS 204 may be transmitted to the first network device 102 via the backhaul network 110. Thus, the first network device 102 may be informed that the CTS 204 has been sent to the second station 108 and that the second station 108 may imminently transmit the data 206 to the second network device 104. As noted above, the duration indicated in the CTS 204 may specify the time period t (or estimate thereof) over which the second station 108 is expected to transmit the data 206 to the second network device 104.

The first network device 102 may determine (e.g., based on or in response to receiving the CTS 204 over the backhaul network 110 from the second network device 104) if a transmission 210 to the first station 106 will or is likely to cause interference with the transmission of the data 206 from the second station 108 to the second network device 104. Accordingly, the first network device 102 may determine if the first network device 102 should delay performing the transmission 210 to the first station 106. These determinations may be based at least on the relative proximity (e.g., the distance d of FIG. 1A) of the first station 106 and the second station 108. Additionally or alternatively, the determination may be based at least on the relative power levels of the first station 106 and the second station 108. As will be discussed in greater detail herein, the first network device 102 (or other network device) may maintain a table of stations and their associated network devices, along with associated power levels.

If the first network device 102 determines that the transmission 210 from the first network device 102 will or is likely to cause interference of the transmission of the data 206 from the second station 108, the first network device 102 may impose a delay, as indicated in FIG. 2, until the transmission of the data 206 is finished or estimated to be finished. The time period of the delay may be at least the time period t during which the second station 108 transmits the data 206 to the second network device 104, thereby avoiding any interference with respect to the reception and/or transmission of the respective first station 106 and second station 108. The determination whether to implement the delay may be based on additional factors, such as the distance between the first station 106 and the second station 108 and/or the power level(s) of the first station 106 and the second station 108.

Figure 3:
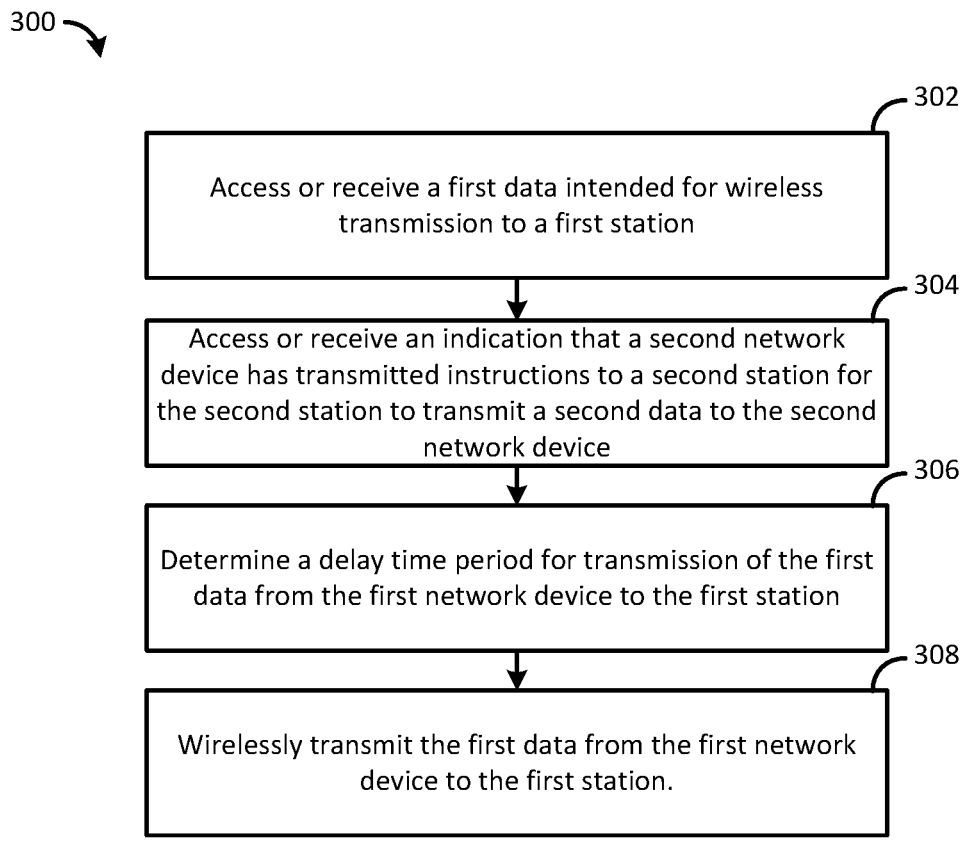
FIG. 3 shows an example method.

FIG. 3 shows an example method 300 to coordinate wireless data communications. At step 302, a first network device (e.g., the first network device 102 of FIG. 1A) may access or receive a first data intended for wireless transmission to a first station (e.g., the first station 106 of FIG. 1A). The intent for the first data to be wirelessly transmitted to the first station may be indicated by a destination address (e.g., IP address or MAC address) indicating the first station and comprised within or otherwise associated with the first data. The first data may comprise any of a variety of forms of data. For example, the first data may comprise flow control data, such as an RTS, CTS, and/or an ACK message intended for transmission to the first station. The RTS message may be based on or responsive to the first network device receiving data that is intended for transmission to the first station. The CTS message intended for transmission to the first station may be based on or responsive to a prior RTS message from the first station. The ACK message may be based on or responsive to data previously received by the first network device from the first station. For example, the first data may comprise data received by the first network device from an outside source but intended for transmission to the first station. The first data may be intended for transmission over the first communication channel 112 of FIG. 1A.

At step 304, the first network device may access or receive an indication that a second network device (e.g., the second network device 104 of FIG. 1A) has transmitted instructions (e.g., the CTS 204 of FIG. 2) to a second station (e.g., the second station 108 of FIG. 1A) for the second station to wirelessly transmit a second data (e.g., the data 206 of FIG. 2) to the second network device. The indication may be transmitted by the second network device.

The first station and the second station may both be within communication range (e.g., the first range 116 and the second range 118 of FIG. 1A) of the first and second network devices. The first network device may be outside of the communication range of the second network device and the second network device may be outside of the communication range of the first network device. Such a configuration is shown in FIGS. 1A and 1B.

As shown in FIG. 1C, the first and second network devices may be outside of communication range of one another. The first station may be within communication range of the first network device but not within communication range of the second network device. The second station may be within communication range of the second network device but not with communication range of the first network device.

Additionally or alternatively, the first and second network devices may be outside of communication range of one another. The first station may be within communication range of both the first and second network devices. However, the second station may be within communication range of the second network device but not the first network device.

The indication that the second network device has transmitted instructions to the second station for the second station to transmit the second data to the second network device may comprise a duration element indicating a time period (e.g., the time period t of FIG. 2), or estimate thereof, during which the second station is expected to transmit the second data to the second station.

Additionally or alternatively, the instructions to the second station (and those corresponding instructions comprising the indication sent to the first network device) may comprise a specified time period instead of a duration element. The specified time period may comprise a future time period with a start time and an end time. According to the techniques and methods described herein, the first network device may delay or otherwise avoid transmission to the first station during this specified time period.

The indication that the second network device has transmitted instructions to the second station for the second station to transmit the second data to the second network device may be transmitted and received over a communication network distinct from the wireless channels used or which will be used to transmit the first data to the first station and the second data to the second network device. For example, this indication may be transmitted from the second network device to the first network device over a backhaul network (e.g., the backhaul network of FIG. 1A). For example, the backhaul network may comprise a wired network, such as an Ethernet or MoCA network. For example, the backhaul network may comprise a wireless network, such as a wireless network operating under a different protocol than that used to convey the first and second data.

At step 306, a delay time period may be determined for the transmission of the first data from the first network device to the first station. The determination of the delay time period may be performed by the first network device. The determination of the delay may be based at least on the received indication that the second network device has transmitted instructions to the second station for the second station to transmit the second data to the second network device. The delay time period may be based at least on the duration element of the received indication from the second network device. As indicated above, the duration element may comprise the estimated time period over which the second station is expected to transmit the second data to the second network element. For example, the delay time period may at least encompass the estimated time period over which the second station is expected to transmit the second data to the second network element. For example, the delay time period may correspond with the estimated time period over which the second station is expected to transmit the second data to the second network element. The delay time period may commence upon receipt by the first network device of the indication (of step 304) received from the second network device. The delay time period may end upon the transmission by the first network device of the first data to the first station.

At step 308, the first network device may wirelessly transmit the first data to the first station. The wireless transmission of the first data may be based at least on the determined delay time period. For example, the first network device may transmit the first data to the first station at a time based at least on the delay time period. The first network device may maintain a delay in transmitting the first data over the delay time period. For example, the delay may span from the time of receiving the indication (of step 304) from the second network device to the time of transmitting the first data to the first station. By delaying the transmission of the first data to the first station, potential interference between the reception of the first data by the first station and the transmission of the second data by the second station may be avoided or minimized.

Figure 4:
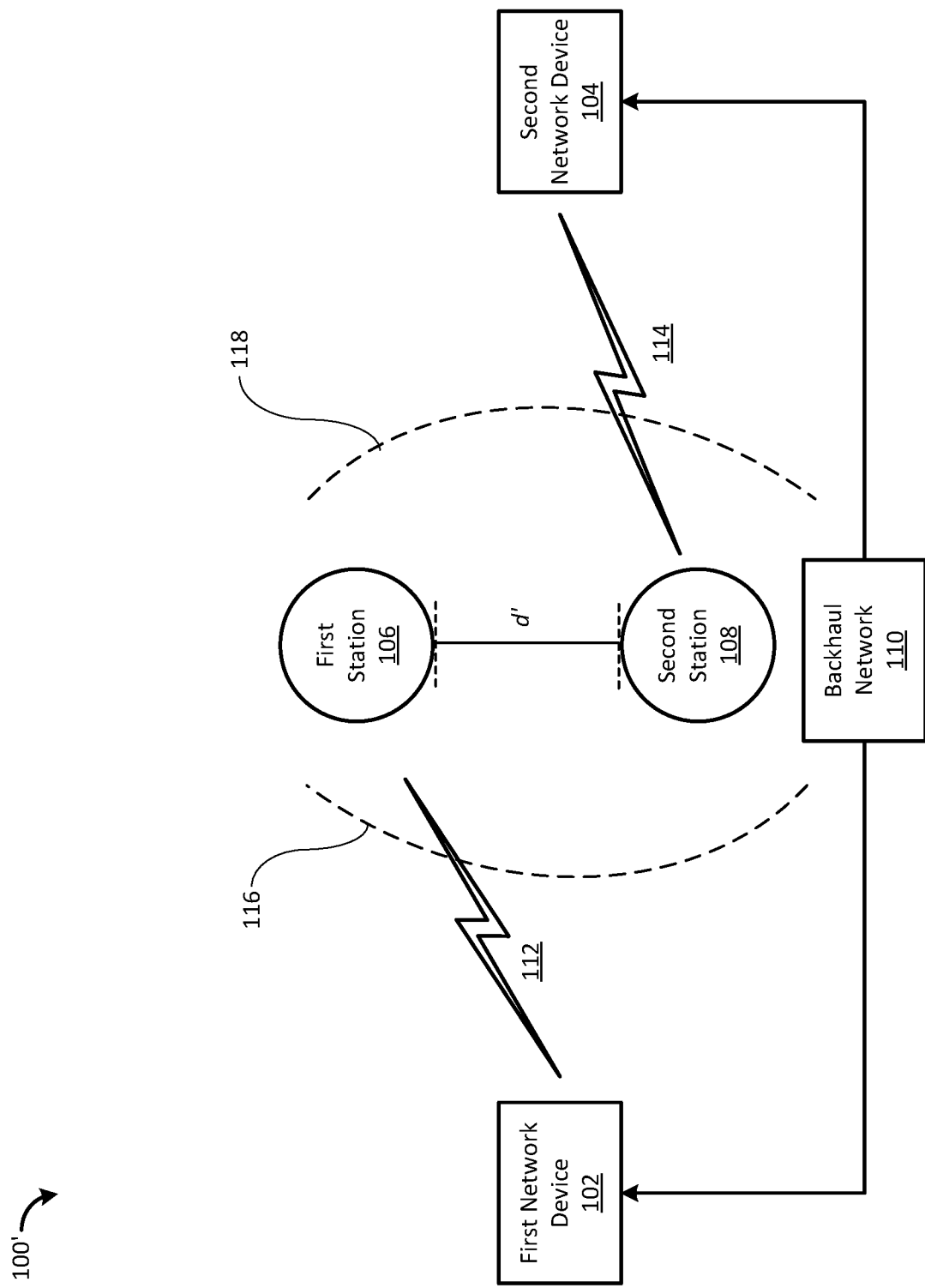
FIG. 4 shows a schematic diagram of an example system.

FIG. 4 shows an example system 100'. The system 100' and elements thereof may be similar in some aspects with those of the system 100 of FIG. 1A. Accordingly, like elements are indicated with like reference characters.

The system 100' may comprise the first station 106 and the second station 108. The first station 106 may be communicatively connected to the first network device 102 over the first communication channel 112. Likewise, the second station 108 may be communicatively connected to the second network device 104 over the second communication channel 114. However, the first station 106 and the second station 108 in the system 100' may be located at a distance d' that is greater than the distance d between the first station 106 and the second station 108 in the system 100 of FIG. 1A. Since the first station 106 and the second station 108 are closer to each other (the short distance d) in the system 100, there is an increased chance that the operations of the first station 106 and the second station 108 may interfere with one another. Conversely, since the first station 106 and the second station 108 are farther from each other (the greater distance d) in the system 100', there is a reduced chance of interference with one another. The potential for the first station 106 and the second station 108 to interfere with one another is not limited to the distance therebetween, but may be additionally or alternatively based on the reception and/or transmission power levels of the first station 106 and the second station 108, the receive sensitivity of the first station 106 and the second station 108, the adjacency of the channels upon which the first station 106 and the second station 108 operate, and other factors discussed herein.

Figure 5:
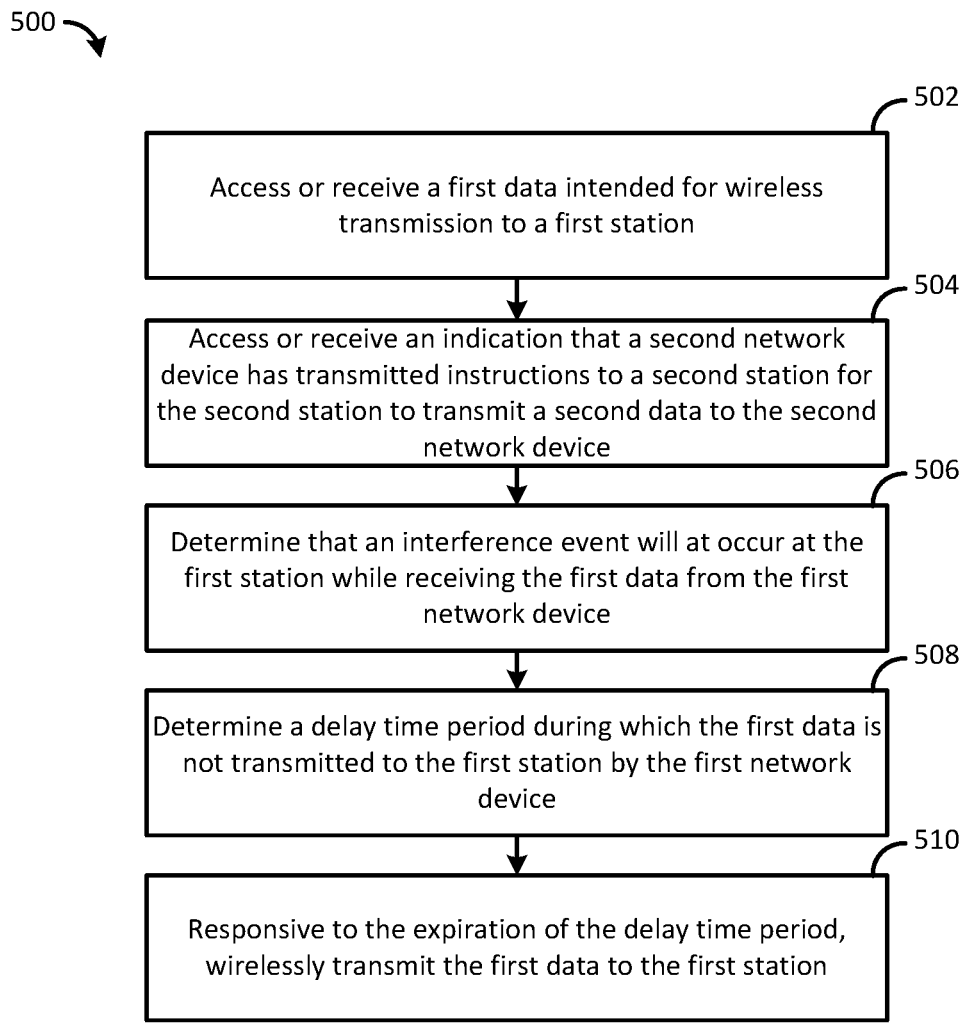
FIG. 5 shows an example method.

FIG. 5 shows an example method 500 to coordinate wireless data communications. At step 502, a first network device (e.g., the first network device 102 of FIG. 1A) may access or receive a first data intended for wireless transmission to a first station (e.g., the first station 106 of FIG. 1A). The intent for the first data to be transmitted to the first station may be indicated as a destination address (e.g., IP address or MAC address) indicating the first station and comprised within or otherwise associated with the first data. For example, the first data may comprise a flow control message, such as an RTS, a CTS, or an ACK message. For example, the first data may comprise data received by the first network device from an outside source, such as an Internet source. The first data may comprise a network address indicating the first station as the delivery destination of the first data.

At step 504, the first network device may access or receive an indication that a second network device (e.g., the second network device 104 of FIG. 1A) has transmitted instructions (e.g., the CTS 204 of FIG. 2) to a second station (e.g., the second station 108 of FIG. 1A) for the second station to wirelessly transmit a second data (e.g., the data 206) to the second network device. The indication may be transmitted by the second network device over a backhaul network (e.g., the backhaul network 110 of FIG. 1A).

The first network device may be outside of the communication range (e.g., the range 116 of FIG. 1A) of the second network device and the second network device may be outside of the communication range (e.g., the range 118 of FIG. 1A) of the first network device. For example, the first and second stations may both be within communication range of both the first and second network devices. For example, one of the first and second stations may be within communication range of both of the first and second network devices and the other of the first and second network devices may be within communication range of one of the first and second network devices. For example, the second station may be within communication range of both of the first and second network devices and the first station may be within communication range of the first network device but not the second network device. For example, shown in FIG. 1C, the first station may be within range of the first network device, but not within range of the second network device. The second station may be within range of the second network device, but not within range of the first network device. In this example, there is no (or only limited or peripheral) overlap between the range of the first network device and the second network device.

The indication from the second network device may comprise a duration element that indicates a time period (e.g., the time period t of FIG. 2), or estimate thereof, during which the second station is expected to transmit the second data to the second network device. Accordingly, the duration element may indicate the time period during which the second station transmits the second data to the second network device.

The indication from the second network device may be transmitted to the first network device via a communication network that differs from the wireless communication channels used to communicate between the first network device and the first station and between the second network device and the second station. For example, this indication may be transmitted from the second network device to the first network device via the backhaul network. The backhaul network may comprise, for example, a wired network, such as an Ethernet or MoCA network. Additionally or alternatively, the backhaul network may comprise a wireless network. The wireless network may operate according to a different protocol than that used in communications between the first network device and the first station and between the second network device and the second station.

At step 506, it may be determined that an interference event will occur at the first station while the first station is receiving the first data from the first network device. The interference event may be due at least in part to interference caused by the wireless transmission of the second data by the second station to the second network device. The determination may be performed by the first network device, for example. The interference may be radio energy interference.

The determination that the interference event will occur may be determined according to one or more factors. The factors may comprise, but are not limited to, the distance between the first and second stations, the power level(s) of the first and/or second stations, the receive sensitivity of the first and/or second stations, the modulation levels used by the first and/or second stations, and/or the adjacent channel rejection (ACR) of the first and/or second stations.

The determination that the interference event will occur may be based at least on the distance (e.g., the distance d of FIG. 1A or the distance d' of FIG. 4) between the first station and the second station. A greater distance between the first and second stations may indicate a lesser probability of interference between the first and second stations. Conversely, a lesser distance between the first and second stations may indicate a greater probability of interference. For example, the relative positioning of the first station 106 and the second station 108 in FIG. 1A, with the distance d therebetween, may tend to lead to a determination that the transmission from the second station will or is likely to cause an interference event at the first station. On the other hand, the relative positioning of the first station 106 and the second station 108 in FIG. 4, with the greater distance d' therebetween, may tend to lead to a determination that the transmission from the second station will not or is likely to not cause interference with reception of the first data by the first station.

The distance between the first and second stations may be determined according to one or more techniques. For example, one or more of the first and second stations may broadcast a probe message. The probe message may serve to notify other stations that the broadcasting probe is within some proximity to the other nodes. For example, a first station receiving a probe from a second station may determine the power level at which the first station receives the probe. From this determined power level, the first station may extrapolate the distance from itself to the transmitting second station. The determined distance between the first station and the second station may be transmitted to any network devices within communication range of the first station. The network device(s) receiving the distance information may use that distance information in performing the various communication operations described herein. In some instances, the first station that had previously received the initial probe described above may, in return, transmit its own probe. That probe may be received, analyzed, etc. by another probe.

To determine a distance between stations, stations may leverage the typical transmissions that occur in a wireless communication environment. For example, a station may change or cycle through available channels and listen for any transmission occurring on those channels. The station may determine the power level of the transmission and thereby determine the distance between the station originating the transmission. The originating station may be identified, for example, according to a receiver or transmitter address, as the case may be, found in an RTS, CTS, or ACK message. This technique may be particularly apt in a WiFi environment in which wireless transmission frequently occur.

To determine a distance between stations, the location of each station may be determined by GPS coordinates or other method to identify discreet locations. The locations may be used by one or more of the network devices to determine the differentials between respective locations of stations and thereby determine the distance therebetween.

The determination that the interference event will occur may be based on one or more of the respective power level of the second station and the power level of the first station. The power level of the stations may be determined by a station broadcasting a probe, which may be received by other stations. The power level of the received probe may be used to determine the power level of the other station. For example, the second station may broadcast a probe. The probe may be received by the first station. Based on the reception power level of the probe, the first station may ascertain the transmission power level of the second station. The power level of the second station may be relayed to the first network device. The power level of the second station (or other relevant stations) may be stored in a table indicating the power level of the respective station. The table may be referenced to determine the power level of a particular station, such as the second station discussed in this method, which in turn may be used in the determination that an interference event will occur at the first station. An example of such a table is described below with reference to FIGS. 7A and 7B.

The determination that the interference event will occur at the first station while receiving the first data from the first network device may be based on one or more of the power levels of the first station and the second station satisfying (e.g., exceeding) a predetermined threshold. The determination of the estimated likelihood of interference may be based on a difference (or absolute value thereof) between the power level of the first station and second station satisfying (e.g., exceeding) a predetermined threshold.

The power level of the first and/or second stations may also be considered in conjunction with the distance between the first and second stations. A high power level may be negated by a sufficient distance between the first and second stations. Conversely, a low power level may still cause interference if the distance between the first and second stations is sufficiently short.

The determination that the interference event will occur at the first station while receiving the first data from the first network device may be based on the ACR of the first station in view of the transmission power of the second station and/or the channels on which the first and second stations operate. It will be recalled that the first network device and the first station may operate on one channel while the second network device and the second station may operate on a second, different channel. For example, if the ACR of the first station, in view of the transmission power of the second station and the operating channels of the first and second stations, satisfies a predetermined threshold, this may be used to determine that the interference event will occur at the first station.

A determination that interference will or is likely to occur, such as described here in relation to step 506 and/or elsewhere in the disclosure, may act as a filter as to which indications from the second network device (e.g., indications that the second station is expected to transmit the second data) may be ignored by the first network device and which indications should result in a delay in the transmission of the first data to the first station. In this manner, the first network device may avoid imposing unnecessary delays in the first network device's transmissions to the first station while still avoiding any interference between the first and second stations.

At step 508, a delay time period may be determined during which the first data is not transmitted to the first station by the first network device. The determination of the delay may be based on or responsive to determining that the interference event will occur.

The indication from the second network device may be used to determine the delay time period. As noted above, the indication may comprise a duration element specifying, at least, an estimated time period (e.g., the time period t of FIG. 2) during which the second station is expected to transmit the second data to the second network device. As such, the delay time period may encompass at least the time period in which the second station is expected to transmit the second data to the second network device. Thus, the potential interference to the first station's reception caused by the transmission of the second data by the second station may be averted.

At step 510, the first data may be wirelessly transmitted to the first station by the first network device. The transmission of the first data to the first station may be based on or responsive to the expiration of the delay time period. The first network device may remain idle with respect to transmitting the first data to the first station during the delay time period. However, the first network device may transmit and/or receive the first data and/or other data to other stations and/or network devices during the delay time period (assuming that those other stations would not also cause interference or be a victim of interference). In other words, the first network device need not remain completely idle during the delay period, but only with respect to the anticipated transmission to the first station.

Figure 6:
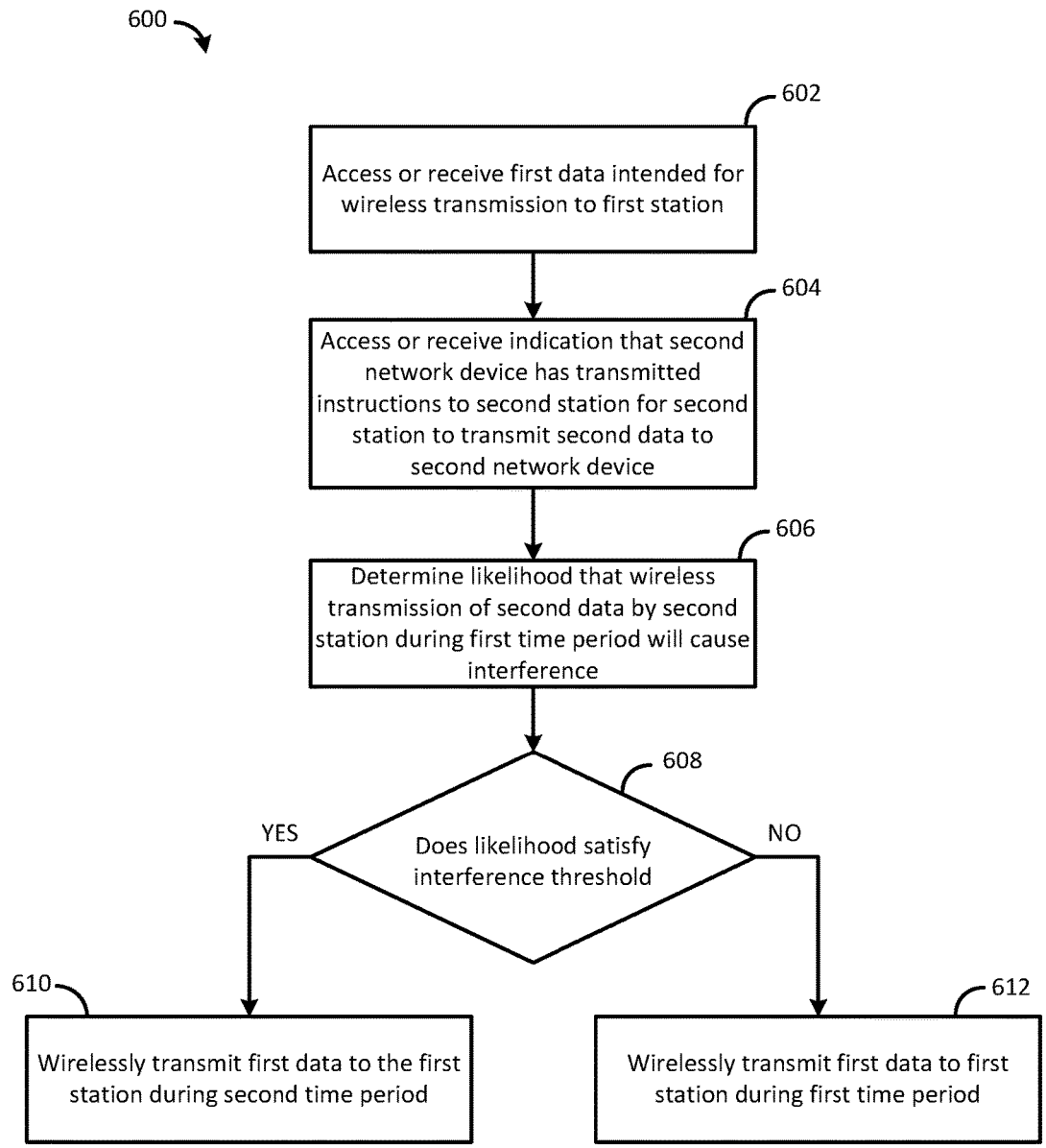
FIG. 6 shows an example method.

FIG. 6 shows an example method 600 to coordinate wireless data communications. At step 602, first data may be accessed or received that is intended for wireless transmission to a first station (e.g., the first station 106 of FIG. 1A). The intent for the first data to be transmitted to the first station may be indicated as a destination address (e.g., IP address or MAC address) indicating the first station and comprised within or otherwise associated with the first data. The first data may be accessed or received by a first network device (e.g., the first network device 102 of FIG. 1A). The first data may comprise flow control data, such as an RTS, CTS, and/or an ACK message. The first data may comprise data received by the first network device from an outside source, such as the Internet or another network. The first data may comprise a network address, such as an IP address, indicating the first station as the delivery destination of the first data.

At step 604, a message may be accessed or received indicating that the second network device (e.g., the second network device 104 of FIG. 1A) has transmitted instructions to a second station (e.g., the second station 108 of FIG. 1A) for the second station to transmit a second data (e.g., the data 206 of FIG. 2) to the second network device. The message may be transmitted from the second network device to the first network device via a backhaul network (e.g., the backhaul network 110 of FIG. 1A). The instructions for the second station to transmit the second data to the second network device may be with regard to a wireless transmission from the second station to the second network device. The message may comprise the CTS 204 of FIG. 2, for example.

The first network device may be out of communication range of the second network device and vice versa. The first station and the second station may each be in communication range of both the first and second network devices. The first station may be out of communication range of the second network device and the second station may be out of communication range of the first network device. The first station may be in communication range of both the first and second network station and the second station may be communication range of the second network device but not the first network device.

As noted above, the message indicating that the second network device has transmitted instructions to the second station for the second station to transmit the second data to the second network device may be transmitted from the second network device to the first network device via a backhaul network. The backhaul network may comprise a wired or wireless network that is distinct from the wireless network used to convey communications between the first network device and the first station and between the second network device and the second station.

At step 606, a likelihood may be determined that a wireless transmission of the second data, during a first period of time, by the second station to the second network device will cause interference in the first station receiving the first data from the first network device. The first time period may correspond to and/or encompass the time period during which the second station is expected to transmit the second data to the second network device (e.g., the time period t of FIG. 2). This expected time period may be indicated as a duration element in the message of step 604 transmitted from the second network element to the first network element via the backhaul network.

The likelihood that the future transmission of the second data by the second station will cause interference during the first period of time may be determined according to one or more of various factors. Those factors may comprise the distance between the first and second stations, the power levels of the first and/or second stations, the receive sensitivity of the first and/or second stations, the modulation level of the first and/or second stations, and/or the adjacent channel rejection (ACR) values of the first and/or second stations. One or more of those factors may be determined by reference to a table (e.g., the table 712 of FIGS. 7A and 7B) indicating a value of the factor with respect to a particular station.

The likelihood that the transmission of the second data by the second station will cause interference at the first station may be represented as a numerical value (e.g., a numerical value with a range of numerical values) or a classification (e.g., a high, medium, or low likelihood).

At step 608, the likelihood determined in step 606 may be compared to an interference threshold. The interference threshold may represent a certainty metric at which the likelihood of interference is deemed acceptable with respect to delays imposed to avoid interference and the potential for corrupt or undelivered data caused by interference. For example, the delays imposed to avoid interference may negatively impact network throughput rates and responsivity. Yet, as mentioned, interference caused by transmission by the second station may result in data sent or attempted to be sent to the first station being lost or corrupted. These two factors may be weighed against each other to determine an acceptable interference threshold.

The interference threshold may be determined according to a network load or an estimated future network load of a system or portion thereof (e.g., a portion defined by the communication range of a given network device). For example, if a system experiences a high network load, the interference threshold may be higher than it would otherwise. This may have the effect of a network device performing a transmission to a station that is relatively certain will not be lost or corrupted due to interference. Since the network load is high, it would be desirable to perform a transmission when the likelihood of reception is high rather than relying on one or more subsequent attempts to actually effectuate the transmission from the network device to the station.

Conversely, if a system has a low network load (e.g., a network device has only a single station within its communication range), the interference threshold may be lower than it would be otherwise. In this case, the network device may still transmit data to a station even if there is a decreased chance that it will be received without interference. Because there is only light or no network traffic, the network device may again attempt the transmission to the station after some delay since the network device is more likely to be free at that later time. In other words, there is little impact from repeated transmission attempts to overall performance of the network device and communications therewith.

As with the determined likelihood, the interference threshold may be represented as a numerical value or a classification. Thus, the numerical value of the likelihood may be compared against the numerical value of the interference threshold, for example. The interference threshold may be represented as a binary range. In this case, the interference threshold may comprise a first value signifying that the transmission of the second data by the second station will cause interference at the first station. A second value of the interference threshold may signify that the transmission of the second data by the second station will not cause interference at the first station.

If the likelihood satisfies (e.g., exceeds) the interference threshold, the method 600 may proceed to step 610. If the likelihood does not satisfy (e.g., is less than) the interference threshold, the method 600 may proceed to step 612.

At step 610, the first network device may wirelessly transmit the first data to the first station during a second time period. The second time period may be subsequent to the first time period (during which transmission by the second station is determined to cause interference at the first station). The second time period may be contiguous with the first time period. That is, the second time period may commence at the end of the first time period. The transmission of the first data to the first station may be performed at the expiration of the first time period, for example By transmitting the first data to the first station during the second time period, any potential interference caused by the second station transmitting the second data may be avoided or minimized.

Additionally or alternatively, if the likelihood of interference does not satisfy the interference threshold, steps may be undertaken to decrease the likelihood that interference will occur and, potentially, be reduced to a value below the interference threshold. For example, a transmitting component, such as the first network device and/or the second station, may adjust its transmission power. For example, the first network device may raise its transmission power level to increase the likelihood that its transmission will be received by the first station, even in light of any potential interference caused by the second station's transmission. For example, the second station may reduce its transmission power level so as to minimize any interference it may cause with respect to the reception by the first station of the transmission from the first network device. The aforementioned power level adjustments are subject to certain limitations. For example, the transmission power level of the second station must not be reduced to such an extent that the second network device is unable to successfully receive the transmission from the second station.

The likelihood of interference may be decreased by a component altering the modulation of its transmission. For example, the first network device may lower its modulation to decrease the likelihood that the second station's transmission will cause interference with the first station's reception of the transmission from the first network device. That is, the first network device may lower the modulation of its transmission to the first station to increase the chance that the transmission will be successfully received by the first station without interference.

As indicated, if the likelihood of interference does not satisfy the interference threshold, the method 600 may proceed to step 612. At step 612, the first network device may wirelessly transmit the first data to the first station during the first time period. That is, the first network device may transmit the first data to the first station while, at least in part, the second station is transmitting the second data to the second network device.

Figures 7A, 7B:
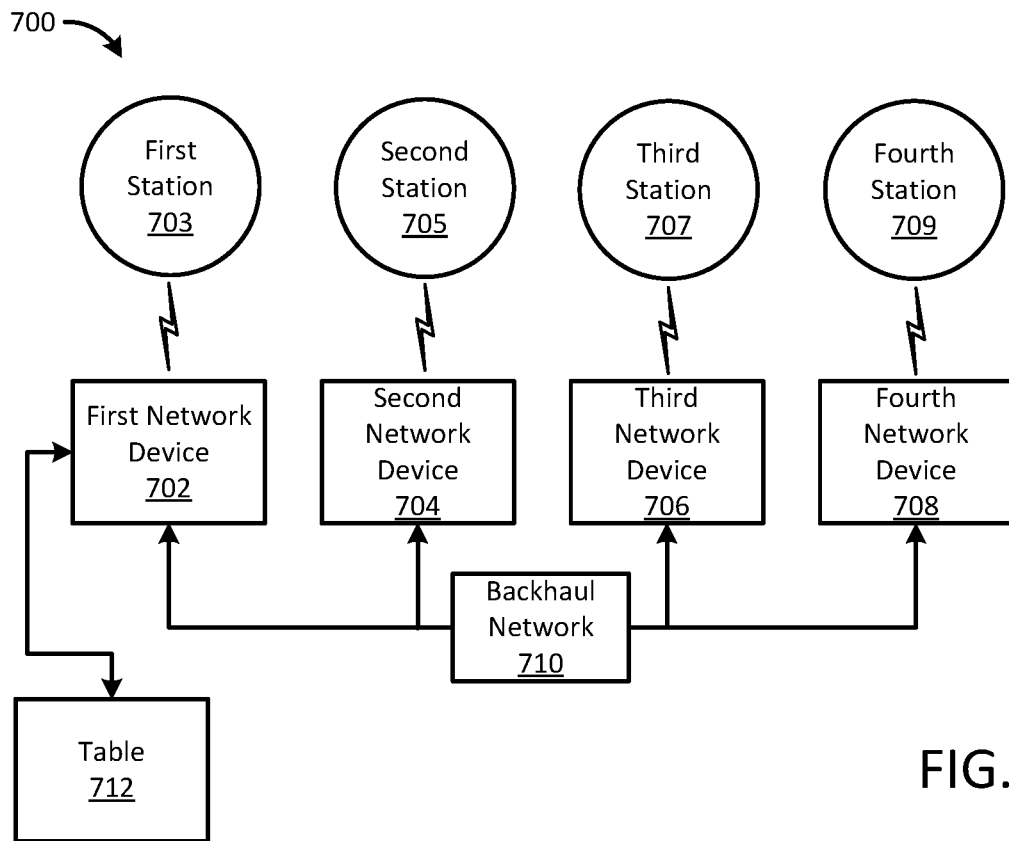
FIG. 7A shows a schematic diagram of an example system.
FIG. 7B shows an example table data structure.

The concepts and principles described herein are similarly applicable to systems comprising more than two network devices and/or comprising more than two stations, including an arrangement with two or more stations associated with a single network device. FIG. 7A schematically shows an example system 700. System 700 may comprise a first network device 702, a second network device 704, a third network device 706, and a fourth network device 708. Each of the network devices may be associated with (e.g., in wireless communication with) a first station 703, a second station 705, a third station 707, and a fourth station 709, respectively. The network devices 702, 704, 706, and/or 708 may be communicatively connected to a backhaul network 710, similar in some aspects to the backhaul network 110 of FIG. 1A.

A transmission from any of the stations 703, 705, 707, 709, (e.g., based on or responsive to a CTS or other similar message from the respective network device 702, 704, 706, 708), may potentially interfere with the reception by another station of a transmission from the respective network device 702, 704, 706, 708. To facilitate interference avoidance, each of the network devices 702, 704, 706, 708 may maintain and/or access a table indicating the other stations in the system, the respective associated network device, and/or the respective power level of the station. A network device may refer to its respective table in determining the power level of the relevant station, which in turn may be used in determining whether a transmission from that station will or is likely to cause interference with the reception at another station of a transmission from the network device.

Such a table 712 may be maintained and/or accessed by the first network device 702 with respect to the other network devices 704, 706, and 708. For clarity of illustration, although not depicted in FIG. 7A, one or more of the other network devices 704, 706, 708 may maintain and/or access an analogous table. It will be noted that a table as described herein also finds application with a system comprising less than two network devices and/or less than two stations, such as the system 100 of FIG. 1A and/or example methods 300, 500, and/or 600 of FIGS. 3, 5, and 6, respectively.

FIG. 7B shows an example of the above-referenced table 712 associated with the first network device 702 of FIG. 7A. The table may comprise an indication of a local station 714 (the first station 703 in this case), an indication of a station 716 (the second station 705, the third station 707, and the fourth station 709 in this case), an indication of a network device 718 associated with the respective station (the second network device 704, the third network device 706, and the fourth network device 708, respectively, in this case), and an indication of the power level 720 of the respective station. The table 712 may additionally or alternatively comprise one or more indications of other attributes 722 of the stations discussed herein, such as an ACR value, modulation value, location, receive sensitivity value, and/or a distance from the local station.

The table 712 may be used by the first network device 702 in determining a potential interference with respect to the first station 703. The first network device 702 may have a pending transmission to the first station 703. Yet, the first network device 702 may receive a message (e.g., a CTS message) from, for example, the third network device 706 indicating that the third network device 706 has transmitted a message (e.g., a CTS message) to the third station 707 instructing the third station 707 to initiate a transmission to the third network device 706. Thus, the third station 707 may imminently perform the transmission to the third network device 706 which may potentially cause interference with the reception of the first network device's 702 transmission to the first station 703. The first network device 702 may reference the table 712 to determine the power level of the third station 707. Based at least on this power level, the first network device 702 may determine if the transmission by the third station 707 will or is likely to cause interference with the reception by the first station 703.

Figure 8:
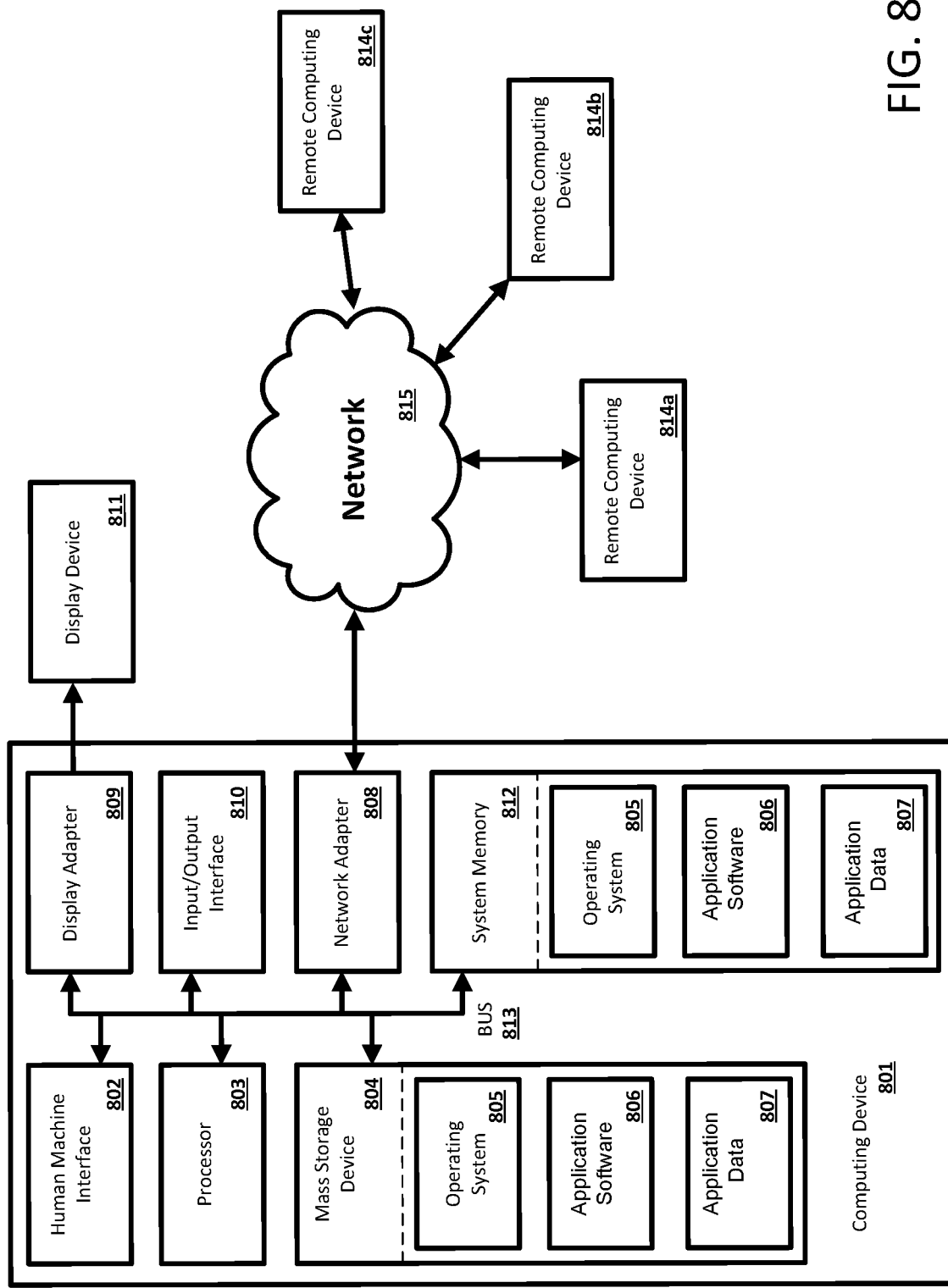
FIG. 8 shows a schematic diagram of an example computing system.

The systems, methods, and apparatuses described herein may be implemented on a computing device such as a computing device 801 (e.g., computer) as shown in FIG. 8 and described below. By way of example, the first network device 102 and the second network device 104 and the first station 106 and the second station 108 may be a computing device as shown in FIG. 8. Similarly, the methods and systems disclosed may utilize one or more computing device to perform one or more functions in one or more locations. FIG. 8 is a block diagram showing an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components shown in the exemplary operating environment.

The systems, methods, and apparatuses described herein may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The systems, methods, and apparatuses described herein may be implemented, in whole or in part, by software components. The disclosed systems and methods may be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods disclosed herein may be implemented via a general-purpose computing device in the form of a computing device 801. The components of the computing device 801 may comprise, but are not limited to, one or more processors 803, a system memory 812, and a system bus 813 that couples various system components including the processor 803 to the system memory 812. In the case of multiple processors 803, the system may utilize parallel computing.

The system bus 813 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP), and a Peripheral Component Interconnects (PCI), a PCI-Express bus, a Personal Computer Memory Card Industry Association (PCMCIA), Universal Serial Bus (USB) and the like. The bus 813, and all buses specified in this description may also be implemented over a wired or wireless network connection and each of the subsystems, including the processor 803, a mass storage device 804, an operating system 805, a service software 806, a service data 807, a network adapter 808, system memory 812, an Input/Output Interface 810, a display adapter 809, a display device 811, and a human machine interface 802, may be contained within one or more remote computing devices 814a,b,c at physically separate locations, connected through buses of this form, in effect implementing a fully distributed system.

The computing device 801 typically comprises a variety of computer readable media. Exemplary readable media may be any available media that is accessible by the computing device 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as service data 807 and/or program modules such as operating system 805 and service software 806 that are immediately accessible to and/or are presently operated on by the processor 803.

In another aspect, the computing device 801 may also comprise other removable/non-removable, volatile/non-volatile computer storage media. By way of example, FIG. 8 shows a mass storage device 804 which may provide non-volatile storage of computer code, computer readable instructions, data structures, program modules, and other data for the computing device 801. For example and not meant to be limiting, a mass storage device 804 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 804, including by way of example, an operating system 805 and service software 806. Each of the operating system 805 and service software 806 (or some combination thereof) may comprise elements of the programming and the service software 806. Service data 807 may also be stored on the mass storage device 804. Service data 807 may be stored in any of one or more databases known in the art. Examples of such databases comprise, DB2®, Microsoft® Access, Microsoft® SQL Server, Oracle®, my SQL, PostgreSQL, and the like. The databases may be centralized or distributed across multiple systems.

In another aspect, the user may enter commands and information into the computing device 801 via an input device (not shown). Examples of such input devices comprise, but are not limited to, a keyboard, pointing device (e.g., a "mouse"), a microphone, a joystick, tactile input devices such as gloves, and other body coverings, and the like. These and other input devices may be connected to the processor 503 via a human machine interface 802 that is coupled to the system bus 813, but may be connected by other interface and bus structures, such as a parallel port, game port, an IEEE 1394 Port (also known as a Firewire port), a serial port, or a universal serial bus (USB).

A display device 811 may also be connected to the system bus 813 via an interface, such as a display adapter 809. It is contemplated that the computing device 801 may have more than one display adapter 809 and the computing device 801 may have more than one display device 811. For example, a display device may be a monitor, an LCD (Liquid Crystal Display), or a projector. In addition to the display device 811, other output peripheral devices may comprise components such as speakers (not shown) and a printer (not shown) which may be connected to the computing device 801 via Input/Output Interface 810. Any step and/or result of the methods may be output in any form to an output device. Such output may be any form of visual representation, including, but not limited to, textual, graphical, animation, audio, tactile, and the like. The display 811 and computing device 801 may be part of one device, or separate devices.

The computing device 801 may operate in a networked environment using logical connections to one or more remote computing devices 814a,b,c. By way of example, a remote computing device may be a personal computer, portable computer, smartphone, a server, a router, a network computer, a peer device or other common network node, and so on. Logical connections between the computing device 801 and a remote computing device 814a,b,c may be made via a network 815, such as a local area network (LAN) and a general wide area network (WAN). Such network connections may be through a network adapter 808. A network adapter 808 may be implemented in both wired and wireless environments. Such networking environments are conventional and commonplace in dwellings, offices, enterprise-wide computer networks, intranets, and the Internet.

For purposes of illustration, application programs and other executable program components such as the operating system 805 are shown herein as discrete blocks, although it is recognized that such programs and components reside at various times in different storage components of the computing device 801, and are executed by the data processor(s) of the computer. An implementation of service software 806 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value.

Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A system comprising:
a first network device; and
a second network device configured to:
determine an anticipated first data transmission between the second network device and a first user device via a first communication protocol;
receive, via a second communication protocol, a message indicating an anticipated second data transmission from a second user device to the first network device via the first communication protocol;
determine, based on the received message, a first time period to delay the first data transmission; and
cause the first data transmission during a second time period subsequent to the first time period.

2. The system of claim 1, wherein the first communication protocol comprises a wireless communication protocol and the second communication protocol comprises a wired communication protocol.

3. The system of claim 1, wherein the first data transmission comprises a data transmission from the second network device to the first user device.

4. The system of claim 1, wherein the second network device is further configured to:
determine, based on the received message, that the second data transmission will cause interference, during at least part of the first time period, with the anticipated first data transmission.

5. The system of claim 1, wherein the message is received from the first network device.

6. The system of claim 1, wherein the second network device is configured to determine the first time period further based on at least one of a power level of at least one of the first user device or the second user device, a distance between the first user device and the second user device, an adjacent channel rejection value of at least one of the first user device or the second user device, a receive sensitivity of at least one of the first user device or the second user device, or a modulation level used by at least one of the first user device or the second used device.

7. The system of claim 1, wherein the message comprises a duration element indicating a third time period during which the second user device is expected to perform the second data transmission,
and wherein the second network device is configured to determine the first time period further based on the third time period.

8. A computer-readable medium storing instructions that, when executed by one or more processors, cause:
determining, by a first network device, an anticipated first data transmission between the first network device and a first user device via a first communication protocol;
receiving, by the first network device and via a second communication protocol, a message indicating an anticipated second data transmission from a second user device to a second network device via the first communication protocol;
determining, based on the received message, a first time period to delay the first data transmission; and
causing the first data transmission during a second time period subsequent to the first time period.

9. The computer-readable medium of claim 8, wherein the first communication protocol comprises a wireless communication protocol and the second communication protocol comprises a wired communication protocol.

10. The computer-readable medium of claim 8, wherein the first data transmission comprises a data transmission from the first network device to the first user device.

11. The computer-readable medium of claim 8, wherein the instructions, when executed by the one or more processors, further cause:
determining, based on the received message, that the second data transmission will cause interference, during at least part of the first time period, with the anticipated first data transmission.

12. The computer-readable medium of claim 8, wherein the message is received from the second network device.

13. The computer-readable medium of claim 8, wherein the determining the first time period is further based on at least one of a power level of at least one of the first user device or the second user device, a distance between the first user device and the second user device, an adjacent channel rejection value of at least one of the first user device or the second user device, a receive sensitivity of at least one of the first user device or the second user device, or a modulation level used by at least one of the first user device or the second used device.

14. The computer-readable medium of claim 8, wherein the message comprises a duration element indicating a third time period during which the second user device is expected to perform the second data transmission, and wherein the determining the first time period is further based on the third time period.

15. A device comprising:
one or more processors; and
memory storing instructions that, when executed by the one or more processors, cause the device to:
determine an anticipated first data transmission from a first user device to the device via a first communication protocol; and
transmit, to a network device and via a second communication protocol, a first message indicating the anticipated first data transmission,
wherein the network device is configured to cause a delay, based on the first message, of a second data transmission between the network device and a second user device via the first communication protocol.

16. The device of claim 15, wherein the instructions, when executed by the one or more processors, further cause the device to:
receive, from the first user device, a request for the first user device to cause the first data transmission, wherein the anticipated first data transmission is determined based on the request.

17. The device of claim 16, wherein the request comprises a request to send (RTS) message.

18. The device of claim 15, wherein the instructions, when executed by the one or more processors, further cause the device to:
transmit, to the first user device, a second message indicating for the first user device to cause the first data transmission.

19. The device of claim 18, wherein the second message comprises a clear to send (CTS) message.

20. The device of claim 18, wherein the first message is transmitted by the device to the network device concurrent with, at least in part, the second message being transmitted by the device to the first user device.

21. The device of claim 15, wherein the first message indicates an expected duration of the first data transmission.

22. The device of claim 15, wherein the second data transmission comprises a data transmission from the network device to the second user device.

23. A system comprising:
a first network device; and
a second network device configured to:
determine an anticipated first data transmission from a first user device to the second network device via a first communication protocol; and
transmit, to the first network device and via a second communication protocol, a first message indicating the anticipated first data transmission,
wherein the first network device is configured to cause a delay, based on the first message, of a second data transmission between the first network device and a second user device via the first communication protocol.

24. The system of claim 23, wherein the second network device is further configured to:
receive, from the first user device, a request for the first user device to cause the first data transmission, wherein the anticipated first data transmission is determined based on the request.

25. The system of claim 24, wherein the request comprises a request to send (RTS) message.

26. The system of claim 23, wherein the second network device is further configured to:
transmit, to the first user device, a second message indicating for the first user device to cause the first data transmission.

27. The system of claim 26, wherein the second message comprises a clear to send (CTS) message.

28. The system of claim 26, wherein the second network device is further configured to:
transmit the first message to the first network device concurrent, at least in part, with transmitting the second message to the first user device.

29. The system of claim 23, wherein the first message indicates an expected duration of the first data transmission.

30. The system of claim 23, wherein the second data transmission comprises a data transmission from the first network device to the second user device.

31. A computer-readable medium storing instructions that, when executed by one or more processors, cause:
determining, by a first network device, an anticipated first data transmission from a first user device to the first network device via a first communication protocol; and
transmitting, to a second network device and via a second communication protocol, a first message indicating the anticipated first data transmission,
wherein the second network device is configured to cause a delay, based on the first message, of a second data transmission between the second network device and a second user device via the first communication protocol.

32. The computer-readable medium of claim 31, wherein the determining the anticipated first data transmission comprises receiving, from the first user device, a request for the first user device to cause the first data transmission.

33. The computer-readable medium of claim 32, wherein the request comprises a request to send (RTS) message.

34. The computer-readable medium of claim 31, wherein the instructions, when executed by the one or more processors, further cause:
transmitting, by the first network device and to the first user device, a second message indicating for the first user device to cause the first data transmission.

35. The computer-readable medium of claim 34, wherein the second message comprises a clear to send (CTS) message.

36. The computer-readable medium of claim 34, wherein the transmitting the first message to the second network device is concurrent with, at least in part, the transmitting the second message by the first network device to the first user device.

37. The computer-readable medium of claim 31, wherein the first message indicates an expected duration of the first data transmission.

38. The computer-readable medium of claim 31, wherein the second data transmission comprises a data transmission from the second network device to the second user device.

* * * * *